J. S. SWANEY.
ROOT CUTTING PLOW.

No. 175,200.          Patented March 21, 1876.

UNITED STATES PATENT OFFICE.

JOHN S. SWANEY, OF MARENGO, IOWA.

IMPROVEMENT IN ROOT-CUTTING PLOWS.

Specification forming part of Letters Patent No. 175,200, dated March 21, 1876; application filed January 15, 1876.

*To all whom it may concern:*

Figure 1:
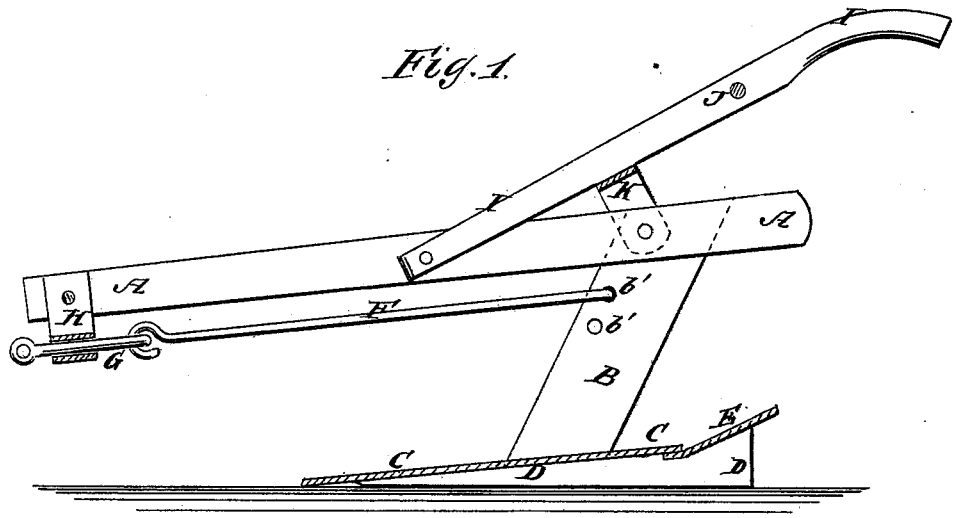
Figure 2:
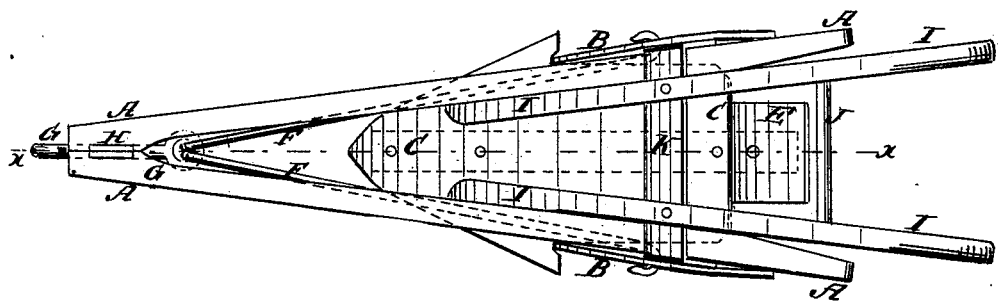

Be it known that I, JOHN S. SWANEY, of Marengo, county of Iowa and State of Iowa, have invented a new and useful Improvement in Root-Cutting Plow, of which the following is a specification:

Figure 1 is a vertical longitudinal section of my improved root-cutting plow, taken through the line $x\,x$, Fig. 2. Fig. 2 is a top view of the same.

The object of this invention is to furnish an improved plow for cutting off the bottom and side roots of hedge, apple, and other seedlings and trees in taking them up, so that they can be readily pulled, and which shall be simple in construction and effective in operation, and may be adjusted to raise the seedlings more or less, as desired.

The invention consists in the combination of the side cutters, the base cutter, the foot-bar, and the draft-rods with each other and with the plow-beams; and in the combination of the inclined plate with the foot-bar and the base cutter of the plow, as hereinafter fully described.

Similar letters of reference indicate corresponding parts.

A are the two parts of the beam of the plow, the forward ends of which are secured to each, and which incline from each other as they extend to the rearward, making the beam V-shaped. To the rear part of the beams A are attached the upper ends of the cutters B, the forward edges of which incline slightly toward each other, so that the soil will not pack between them. The lower ends of the side cutters B are formed upon or securely attached to the base cutter C, which is a flat plate with a V-shaped or pointed forward end. To the bottom of the base cutter C is attached a long bar, D, which is made slightly wedge-shaped to give the proper inclination to the said base cutter C. The bar D extends to the rear of the base cutter C, and to said projecting part is attached a plate, E, the forward edge of which underlaps the rear edge of the said base cutter C. The plate E may receive any desired inclination, to raise the seedlings less or more, as may be desired. The side cutters B may be made of any desired length, according to the height of the seedlings to be operated upon, and in their upper forward parts are formed one or more holes, $b'$, to receive the rear ends of the draw-rods F, the forward ends of which meet and are connected with the rear end of a short rod, G, that passes through the keeper H attached to the forward end of the beam A. The draft is applied to the forward end of rod G. I are the handles, the forward ends of which are attached to the beams A. The handles I are connected by a round, J, and are supported at the proper elevations by a bail, K, to which said handles are attached, and the ends of which are attached to the said beams A. By this device the bottom and side roots are cut off, and the seedlings raised more or less, so that they can be easily pulled.

Having thus described my invention, I claim as new and desire to secure by Letters Patent—

In a root-cutting or transplanting plow, the combination, with two diverging beams, of the side cutters B B, inclined base cutter C, inclined plate E, and wedge-shaped sole D, substantially as herein shown and described.

JOHN S. SWANEY.

Witnesses:
 T. F. MURPHY,
 C. HEDGES.